United States Patent
Schips et al.

(10) Patent No.: US 8,074,449 B2
(45) Date of Patent: Dec. 13, 2011

(54) HYDRODYNAMIC CLUTCH

(75) Inventors: Rainer Schips, Ellwangen (DE); Daniel Flemmer, Crailsheim (DE); Rolf Brockmann, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 126 days.

(21) Appl. No.: 12/512,544

(22) Filed: Jul. 30, 2009

(65) Prior Publication Data

US 2009/0314598 A1    Dec. 24, 2009

Related U.S. Application Data

(63) Continuation of application No. PCT/EP2008/000515, filed on Jan. 24, 2008.

(30) Foreign Application Priority Data

Jan. 31, 2007  (DE) .......................... 10 2007 005 663

(51) Int. Cl.
*F16D 33/04*    (2006.01)
(52) U.S. Cl. ......................................................... 60/353
(58) Field of Classification Search .................... 60/353, 60/365
See application file for complete search history.

(56) References Cited

U.S. PATENT DOCUMENTS

| 2,354,596 A | * | 7/1944 | Jandasek ........................ 60/353 |
| 3,270,838 A | * | 9/1966 | Schweizer ...................... 60/365 |
| 3,955,367 A | | 5/1976 | Becker | |

FOREIGN PATENT DOCUMENTS

| DE | 582886 | 8/1933 |
| DE | 621413 | 11/1935 |
| DE | 682276 | 10/1939 |
| DE | 1010788 | 6/1955 |
| DE | 10353518 A1 | 6/2005 |
| DE | 10353554 A1 | 6/2005 |
| DE | 102005050219 B3 | 6/2007 |
| EP | 1762737 A2 | 3/2007 |
| WO | 2005050047 A1 | 6/2005 |

* cited by examiner

*Primary Examiner* — Daniel Lopez
(74) *Attorney, Agent, or Firm* — Taylor IP, P.C.

(57) ABSTRACT

Impeller and turbine wheels form a toroidal working chamber of a hydrodynamic clutch filled with working medium. A throttle plate extends circumferentially near a central diameter of the working chamber The throttle plate moves axially, from an inactive position with little or no throttling effect on a circular flow of the working medium, to an active position with a greater throttling effect on the circular flow. The working chamber is without a center wall, such that the throttle plate is directly enclosed by the flow zone of the working chamber in both the active and inactive position of the throttle plate. The inactive position is located in the area of a separation gap between the impeller and the turbine wheel.

6 Claims, 2 Drawing Sheets

HYDRODYNAMIC CLUTCH

CROSS REFERENCE TO RELATED APPLICATIONS

This is a continuation of PCT application No. PCT/EP2008/000515, entitled "HYDRODYNAMIC CLUTCH", filed Jan. 24, 2008, which is incorporated herein by reference.

BACKGROUND OF THE INVENTION

1. Field of the Invention

The invention relates to a hydrodynamic clutch.

2. Description of the Related Art

Hydrodynamic clutches are known. They comprise an impeller and a turbine wheel which, as a rule, are the two only blade wheels of the hydrodynamic clutch. Accordingly, no stator is provided.

As a rule, the impeller and the turbine wheel jointly form a toroidal working chamber which is or can be filled with a working medium, for example oil, water or water-mixture. In the impeller the working medium is accelerated in radial direction outward, enters into the turbine wheel where it is slowed in radial inward direction and again enters into the impeller. By means of this working medium circulation the torque or respectively power is transferred free from wear and tear, from the impeller to the turbine wheel.

In the known state of the art, stationary or movable throttle plates are provided in hydrodynamic clutches in order to influence the working medium circulation and thereby the transfer behavior of the hydrodynamic clutch, especially to specifically adjust it. DE 103 53 518 A1 for example, describes two alternative options of providing throttle plates. According to a first embodiment stationary throttle plates which are located in axial direction of the hydrodynamic clutch, or in radial direction of the hydrodynamic clutch are provided which, depending on the slippage between impeller and turbine wheel exert a more or less throttling effect upon the working medium circuit. According to the second embodiment movable wall sections of the impeller wheel are provided, in order to influence the working medium circuit.

The disclosure document WO 2005/050047 A1 describes throttle plates extending in radial direction of the hydrodynamic clutch, which can be moved alone or jointly with a part of the impeller or turbine wheel of the hydrodynamic clutch in order to be optionally introduced into the circuit flow of working medium in the working chamber, thereby influencing the transfer behavior of the hydrodynamic clutch.

In the first-mentioned embodiment according to DE 103 53 518 A1 with stationary axially aligned throttle plates a targeted adjustment of the transfer behavior of the clutch is possible only to a limited extent. On the contrary, a firmly predetermined dependency on the effect of the throttle plate on the slippage results. Even the suggested displacement of parts of the blade wheel wall of the impeller, especially in the area of the radial outer diameter of the hydrodynamic clutch, or respectively its working chamber permits only a limited exertion of influence upon the transfer behavior.

In the embodiment according to the aforementioned WO-publication 2005/050047 A1 a comparatively great force is required to displace the throttle plate in axial direction due to the radial orientation of the throttle plate. As a rule, the fill level in the hydrodynamic clutch—that is the volume of working medium which circulates in the working chamber—must therefore be reduced, in order to be able to implement the axial movement of the throttle plate.

The disclosure document DE 103 53 554 A1 according to one embodiment describes a ring-shaped throttle plate which comprises a horizontal segment of an annular slide extending in circumferential direction of the hydrodynamic clutch and which is operable through an adjustment mechanism that is located radially outside the working chamber.

The patent documentation DE 582 886 describes a throttle plate which, in circumferential direction of the hydrodynamic clutch progresses in the area of a central diameter of the working chamber and from the perspective of an axial section across the hydrodynamic clutch extends with its intake side against which the circulation flow of working medium flows, parallel to the axis of rotation of the hydrodynamic clutch. In order to move the throttle plate into its active position, it is displaced out of the working chamber into a core ring area which is limited by a wall in relation to the working chamber. In its inactive position the throttle plate is not immediately surrounded by the flow zones of the working chamber, but is separated from them by the wall which forms the core ring area. The demonstrated embodiment requires a high constructive expenditure.

It is an objective of the current invention to provide a hydrodynamic clutch including a throttle plate to influence the transmission ratio of the hydrodynamic clutch. On the one hand a great effect upon the transmission behavior, that is the power transmitted from the impeller to the turbine wheel, or respectively the transmitted torque is possible through axial displacement of the throttle plate inside, or respectively into the working chamber. On the other hand a slight displacement of the throttle plate in any operating status and at any fill level of the hydrodynamic clutch is ensured. In addition an embodiment of the hydrodynamic clutch is created which is constructively simple and as compact as possible.

The inventive hydrodynamic clutch comprises an impeller and a turbine wheel which jointly form a toroidal working chamber that can be or is filled with a working medium. A throttle plate is provided which can be moved in axial direction of the hydrodynamic clutch in order to be optionally introduced into the working chamber and/or to be displaced within the working chamber.

According to the invention the throttle plate extends in the circumferential direction of the hydrodynamic clutch, that is around the rotational axis of the hydrodynamic clutch, as a rule in a ring shape, elliptical shape or also in a square shape. The throttle plate can be a continuous design or can be discontinuous in circumferential direction of the hydrodynamic clutch.

According to the invention the throttle plate is provided in the area of the central diameter of the working chamber. This means it is located with a distance relative to the outside diameter of the working chamber and relative to the inside diameter of the working chamber.

The throttle plate extends in an axial direction of the hydrodynamic clutch. This means it comprises an intake side against which the working medium flows, thus creating a circulation in the working chamber and which, from the perspective of an axial section across the hydrodynamic clutch extends parallel to the axis, or substantially parallel to the rotational axis of the hydrodynamic clutch. The axial section is carried through the rotational axis of the hydrodynamic clutch. The term "parallel to the axis" is understood to be not only an exact parallelism with the axis, but also a certain angular arrangement of the intake side of the throttle plate relative to the rotational axis of the hydrodynamic clutch is possible. The more defined the angle, the stronger is the force which is required to displace the throttle plate in the axial direction. The angle should therefore be relatively small. In each instance it is to be less than 90°, for example between 0 and 45°, especially between 0 and 30° and especially advantageously between 0 and 10°, or 0 and 5° relative to the rotational axis of the hydrodynamic clutch.

The hydrodynamic clutch can be in the embodiment of a hollow cylinder or a sector of a hollow cylinder, for example a plurality of individual sectors of a hollow cylinder. In both cases the distance of the throttle plate from the rotational axis of the hydrodynamic clutch is constant over the entire circumference of the hydrodynamic clutch. Obviously, other forms with varying distance relative to the rotational axis over the circumference of the hydrodynamic clutch are considered. In angular arrangements, for example, conical forms of sections of cones are considered.

The throttle plate is advantageously supported by an adjustment mechanism and/or is connected to such a mechanism which engages with the throttle plate in a central area in a radial direction from the inside and/or a radial direction from the outside. The throttle plate, jointly with the component of the adjustment mechanism engaging with it forms in particular a T, viewed in an axial perspective through the hydrodynamic clutch, or respectively in circumferential direction through the throttle plate and the adjustment mechanism.

According to the invention the throttle plate—especially in the latter design variation—can be moved from an inactive position which is located in the area of the separation gap between the impeller and the turbine wheel of the hydrodynamic clutch into an active position, which is provided in the impeller or turbine wheel in the area of a central diameter of the working chamber. The required physical axial space for the throttle plate in its active position throttling the circulation of working medium, as well as in its inactive position which does not inhibit the circulation of working medium in the working chamber is hereby minimal, especially since the path of movement of the throttle plate is located entirely or substantially entirely, at least in axial direction or in any direction of the hydrodynamic clutch inside the working chamber.

The throttle plate is located directly in the working chamber in its active position, as well as in its inactive position. This means that it is not separated by a wall or something similar from the working chamber. On the contrary, from the perspective of an axial section across the hydrodynamic clutch the working chamber possesses a cross section that is without a central area which is delimited by a wall. Therefore, the throttle plate in its inactive, as well as in its active position is directly surrounded by the flow zones of the working chamber, in other words, without insertion components between them. Advantageously, the throttle plate is movable only inside the working chamber.

In an especially advantageous embodiment, the cross section of the working chamber, from the perspective of an axial section across the hydrodynamic clutch displays a full circular shape or respectively a full surface form, which could result from an elliptical shape or respectively from a shape deviating from the circular shape. These statements refer to one respective halve of the hydrodynamic clutch since in this axial perspective, the cross section of the working chamber naturally occurs respectively once on each side of the rotational axis of the hydrodynamic clutch.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrates embodiments of the invention (, in one form,) and such exemplifications are not to be construed as limiting the scope of the invention in any manner.

DETAILED DESCRIPTION OF THE INVENTION

Figure 1:
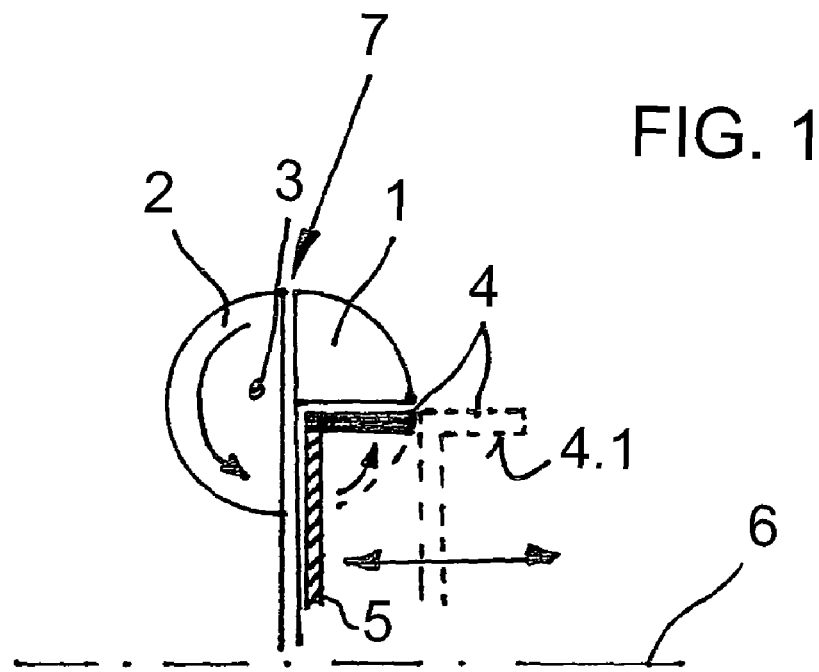
FIG. 1 shows the required axial construction space for a throttle plate in a hydrodynamic clutch which, as is conventional, possesses an inactive position outside the working chamber.

FIG. 1 illustrates a schematic axial section through a hydrodynamic clutch. Only one side above the rotational axis 6 of the hydrodynamic clutch is depicted. The impeller 1 and the turbine wheel 2 are shown which jointly form a toroidal working chamber. In the impeller 1, a throttle plate 4 with a connected adjustment mechanism 5 is located in the area of the central diameter of the working chamber 3. The circulation flow of working medium in the working chamber 3 (see arrows) impact the throttle plate 4 in radial direction from the inside toward the outside on the intake side 4.1 of the throttle plate 4 which extends parallel to the axis, or respectively in a ring form (continuous or discontinuous) around the rotational axis 6 or the hydrodynamic clutch.

Solid lines show the active position of the throttle plate 4 with the adjustment mechanism 5. The broken lines illustrate the inactive position. As can be seen, the throttle plate 4 can be moved from an area axially outside the working chamber 3 (inactive position) more or less into the working chamber 3 by way of the adjustment mechanism 5 until it reaches the maximum throttle position (active position) which is shown in solid lines where, viewed in radial direction toward the outside, the entire or substantially the entire cross section of the impeller 1 is covered by the throttle plate 4. The cover may be a complete one in circumferential direction around the rotational axis 6, or an intermittent one, depending upon the construction of the throttle plate 4.

In the position where maximum throttling occurs, the throttle plate 4 therefore extends in axial direction from the separation gap 7 between the impeller 1 and the turbine wheel 2 to the axial outer end of the impeller 1. Since the throttle plate 4 is moved axially completely out of the working chamber 3 in order to reach the inactive position an appropriate constructional space is to be provided in the hydrodynamic clutch, axially outside the working chamber 3, or respectively the impeller 1.

Figure 2:
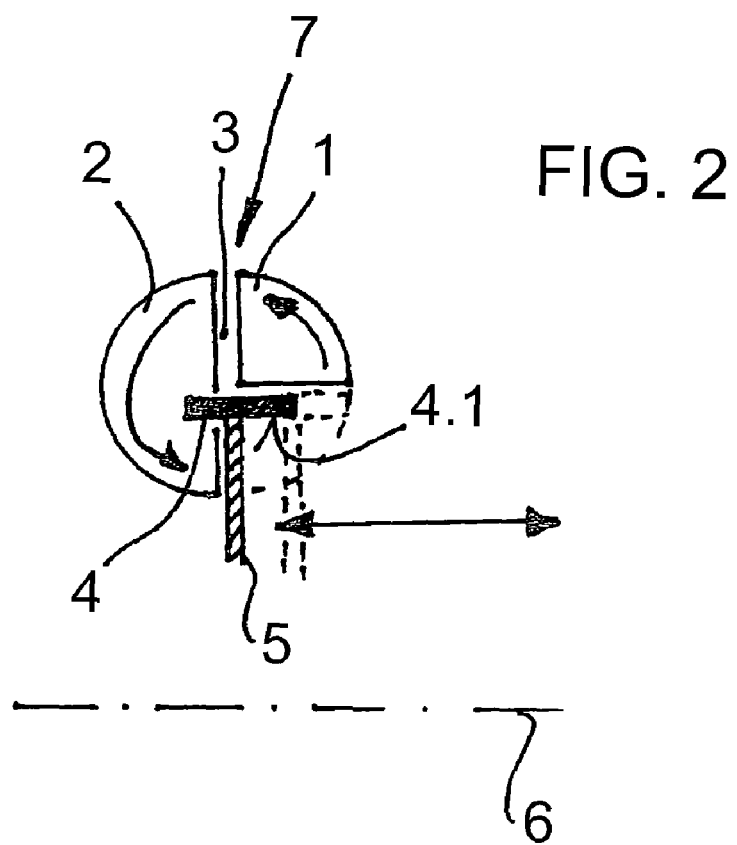
FIG. 2 shows an inventive embodiment which permits an especially compact construction.

According to the embodiment illustrated in FIG. 2, a more compact form can be achieved according to the invention, at least in axial direction of the hydrodynamic clutch. In this case the inactive position of the throttle plate 4 together with the adjustment mechanism 5 is not provided outside the working chamber 3. Instead, it is provided advantageously inside it, in the area of the center of the circle of the toroidal working chamber, or respectively in the area of the center of circulation of the working medium flow inside the working chamber 3, according to the depiction of the throttle plate 4 with the adjustment mechanism 5—shown in solid lines. During the transition from the inactive position into the active position (illustrated by broken lines) the throttle plate 4 is moved by means of the adjustment mechanism 5 from the area of the separation gap 7 between the impeller 1 and the turbine wheel 2 axially, in direction of the impeller 1, until part of the cross section, or the entire cross section in radial direction of the impeller 1 is enclosed by the throttle plate 4. Regarding the embodiment of the throttle plate 4, or respectively the enclosing of the cross section of the impeller 1 in circumferential direction of the hydrodynamic clutch, the comments made in respect to FIG. 1 apply.

According to the inventive design illustrated in FIG. 2, no constructional space for the throttle plate 4 and/or the adjustment mechanism 5 is therefore to be provided in axial and/or radial direction outside the working chamber 3. Instead, the throttle plate 4 is moved or displaced advantageously only inside the working chamber 3 from an inactive position in which it has no throttling effect, or substantially no throttling effect on the circulating flow of working medium in the working chamber 3 into a position in which it interrupts, diverts or throttles the circulating flow of working medium in the working chamber 3, and back.

FIG. 1, as well as FIG. 2, illustrates an embodiment where the throttle plate 4 can be moved into the working chamber 3 in the area of the impeller 1. Obviously it is possible, in addition or alternatively, to move the throttle plate 4 into the area of the working chamber 3 which is embodied by the turbine wheel 2. Deviating from the illustrated designs it is also possible, alternatively or in addition to support the throttle plate 4 through an adjustment mechanism 5, or to connect it to said mechanism which extends in radial direction from the outside toward the inside into the working chamber 3 and which is connected from the outside (in radial direction) to the throttle plate 4. An adjustment mechanism 5 which engages the throttle plate in axial direction, which is preferably axially aligned and is aligned especially with the throttle plate 4 can also be used alternatively or in addition in order to move the throttle plate 4 in axial direction.

In the embodiment according to FIG. 1 the throttle plate 4, together with the adjustment mechanism 5 has the shape of an inverted L, always relative to an axial section through the hydrodynamic clutch above the rotational axis 6. Below the rotational axis 6 the axial section would of course display an L in its upright position.

In the embodiment according to FIG. 2 a corresponding axial section shows a T which is created by the throttle plate 4 together with the adjustment mechanism 5.

Figure 3:
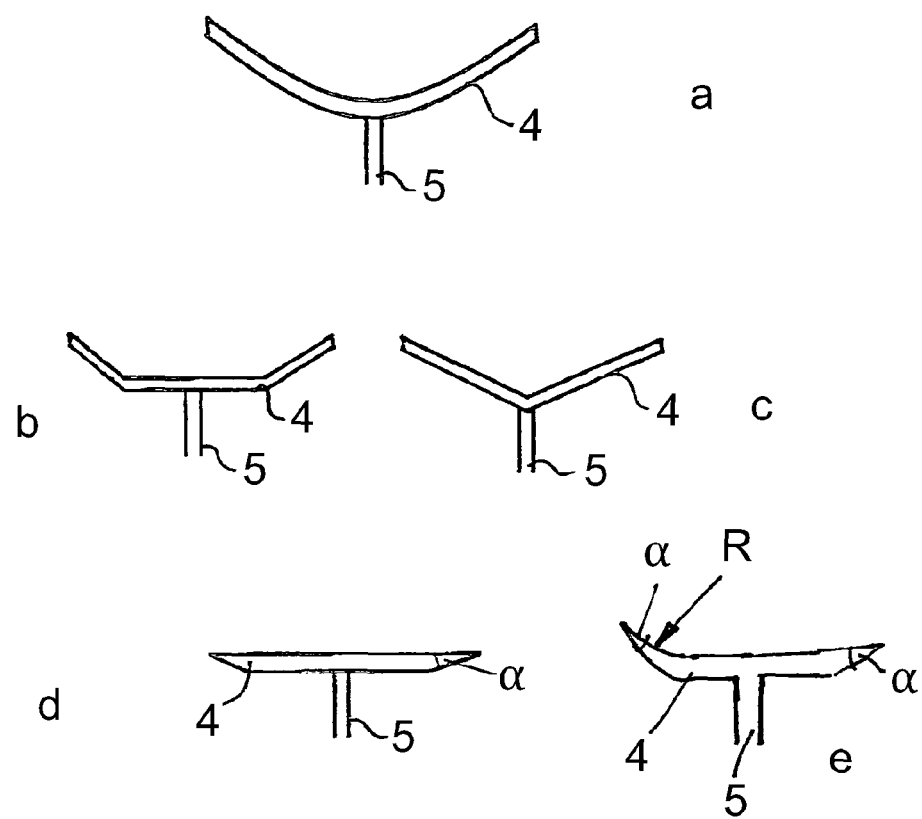
FIG. 3 shows possible design variations for the embodiment of the throttle plate, shown in an axial section through the hydrodynamic clutch.

FIG. 3 illustrates examples of possible design variations for the throttle plate 4, shown as axial sections through the hydrodynamic clutch. According to FIG. 3a the throttle plate 4 is curved, so that its two free axial ends are arranged on a larger diameter than their axial center.

The radius of curvature may for example be in a range which is limited upward by the difference between the outside diameter of the working chamber and the inside diameter of the working chamber, and downward by one quarter of this difference.

According to FIG. 3 the curvature in FIG. 3a is replaced by individual segments, adjacent to each other in an angular layout. In the shown arrangement the center segment extends parallel to the axis of the rotational axis of the hydrodynamic clutch, and the two axial outer segments are connected to the center segment, at an angle in direction of a larger diameter.

In the arrangement in FIG. 3c only two segments, located at an angle to each other are provided which are connected jointly at their axial inner end to the adjustment mechanism 5 and whose two free ends again, are arranged on a larger diameter than the ends which are connected to the adjustment mechanism 5.

According to FIG. 3d the throttle plate 4 has a tip at the intake area and/or the outlet area with an angle α. The angle α is for example between 10° and 45°.

According to FIG. 3e the two axial ends of the throttle plate 4 are shaped differently. The (free) axial end which during movement of the throttle plate 4 from its inactive position in the area of the separation gap between the impeller and the turbine wheel into its active position inside the circulating flow of working medium in the working chamber faces the circulation center or respectively the axial center of the working chamber, ends on a larger diameter than the opposite axial end which faces the blade wheel floor. The axial end of the throttle plate 4 facing the circulation center on the comparatively larger diameter optimizes the throttling effect of the throttle plate 4, whereas the opposite axial end of the throttle plate 4 which is arranged on a smaller diameter of the hydrodynamic clutch and which extends completely parallel to the axis, or respectively linear, especially in an axial perspective through the hydrodynamic clutch, permits a smaller recess in the blade wheel, especially the impeller 1 which receives the throttle plate 4 in its active position. This is accentuated particularly by the FIGS. 1 and 2 in which the "interfering" engagement of the throttle wheel into the impeller 1, or respectively into the blades of same can be seen.

In the embodiment shown in FIG. 3e the end of the throttle plate 4 which is positioned on the comparatively larger diameter of the hydrodynamic clutch is rounded off with a radius R toward a larger diameter. Obviously it is also possible, in addition or alternatively to construct the relevant axial end, or respectively the transition from the axial center of the throttle plate 4 to the corresponding axial end with one or several angles. The opposite axial end of the throttle plate 4 which essentially extends on a constant diameter of the hydrodynamic clutch in the illustrated design variation, which however could also be rounded and/or angled in direction of a smaller diameter, or which, to a smaller extend than the previously described axial end could be rounded or angled in direction of a larger diameter, again displays a tip having an angle α in the illustrated embodiment. As illustrated, both axial ends of the throttle plate 4 can display a tip having an angle α which can be of identical size, or can vary from each other.

In place of the adjustment mechanism 5 shown in FIG. 3 which engages the throttle plate 4 in a radial direction from inside it is obviously also possible to provide an adjustment mechanism (not illustrated) in addition or alternatively which engages the throttle plate 4 in radial direction from the outside. Accordingly, the throttle plate together with the part of the adjustment mechanism which is connected to it, does not display the shape of a "correctly oriented" T but instead that of an inverted T, viewed in the axial perspective through the hydrodynamic clutch. Also those shapes according to FIGS. 3a through 3c (or correspondingly inverted) whose "cross members" of the T are not in a straight line, but are curved or provided with angles are to be understood to be "T-shapes". The "cross member" can be provided either in direction of a larger diameter of the hydrodynamic clutch or in direction of a smaller diameter of the hydrodynamic clutch, curved or with angles, whereby, as illustrated in FIG. 3e the two axial ends can be different from each other.

Figure 4:
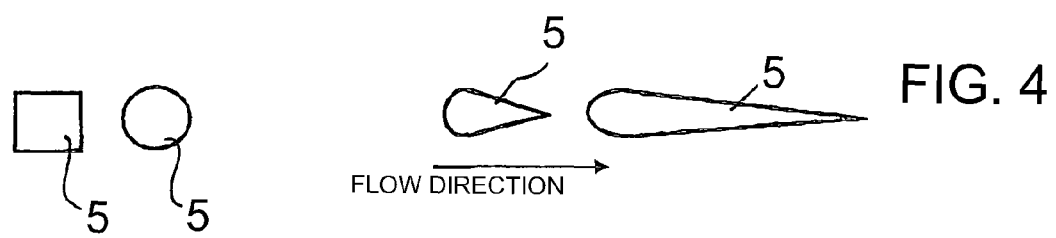
FIG. 4 shows possible cross section shapes for the adjustment mechanism in a perspective parallel to the rotational axis of the hydrodynamic clutch, or respectively in circumferential direction around the rotational axis of the hydrodynamic clutch.

FIG. 4 illustrates a cross section through the adjustment mechanism 5 as seen in a top view in radial direction through the hydrodynamic clutch from the outside toward the inside. The adjustment mechanism 5 may for example have a square, polygonal, round or profiled cross sectional shape, the latter especially in a shape favorable to flow, for example drop-shaped, as known from turbine blades or airfoils.

The adjustment mechanism 5 may for example comprise links distributed around the circumference of the hydrodynamic clutch, especially at equal distances from each other— for example 3 to 12 links whereby each respectively supports one throttle plate segment, or together in groups support one throttle plate segment, or all of which together support a throttle plate which is continuous in circumferential direction and which could then also be described as a throttle ring.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic clutch, comprising:
   an impeller and a turbine wheel which jointly form a toroidal working chamber which is configured to be filled with a working medium;
   a throttle plate movable in an axial direction of the hydrodynamic clutch in order to be at least one of selectively introduced into or displaced within the working chamber; said throttle plate progressing in circumferential direction of the hydrodynamic clutch in the area of a central diameter of the working chamber, and from the perspective of an axial section across the hydrodynamic clutch extending with an intake side—against which a circulation flow of the working medium flows—parallel to an axis of rotation of the hydrodynamic clutch;
   said throttle plate being movable from an inactive position where it has no, or only a very insignificant throttling effect upon the circulation flow of working medium in the working chamber into an active position where it has a comparatively substantially greater throttling effect upon the circulation flow, and whereby the inactive position is located in the area of a separation gap between the impeller and the turbine wheel; and
   wherein from a perspective of an axial section across the hydrodynamic clutch the working chamber has a full surface form without a central area which is delimited by a wall relative to the remaining working chamber, so that the throttle plate in its active position, as well as also in its inactive position is directly surrounded by the flow zones of the working chamber, without a wall inserted in between.

2. The hydrodynamic clutch according to claim 1, wherein the throttle plate is one of a hollow cylinder and a sector of a hollow cylinder.

3. The hydrodynamic clutch according to claim 1, wherein the throttle plate is connected to and supported by an adjustment mechanism, whereby the throttle plate is connected rigidly to the adjustment mechanism.

4. The hydrodynamic clutch according to claim 3, wherein the throttle plate together with the part of the adjustment mechanism which is connected to it, viewed in an axial section through the hydrodynamic clutch, is one of L-shaped and inverted L shaped.

5. The hydrodynamic clutch according to claim 3, wherein the throttle plate together with the part of the adjustment mechanism which is connected to it, viewed in an axial section through the hydrodynamic clutch, is one of T-shaped and inverted T shaped, the adjustment mechanism engaging in the central area of the throttle plate and extending in a radial direction.

6. The hydrodynamic clutch according to claim 3, wherein, viewed in an axial section through the hydrodynamic clutch, a first axial end of the throttle plate ends on another larger diameter of the hydrodynamic clutch than the second, axially located opposite end of the throttle plate, whereby the axial end which faces the center of the circulation flow in the active position of the throttle plate is arranged on a larger diameter than the opposite axial end.

* * * * *